United States Patent
Norem

Patent Number: 5,924,715
Date of Patent: Jul. 20, 1999

[54] MUD GUARD MOTORCYCLE FORK

[76] Inventor: Marlin A. Norem, 6205 Birchwood, Corpus Christi, Tex. 78412

[21] Appl. No.: 08/827,337

[22] Filed: Mar. 26, 1997

Related U.S. Application Data

[51] Int. Cl.⁶ ................................................. B62K 25/08
[52] U.S. Cl. ........................ 280/276; 280/152.1; 280/852
[58] Field of Search ................................ 280/276, 219, 280/847, 152.1, 152.2, 152.3, 852, 851, 855, 158.1, 160.1

[56] References Cited

U.S. PATENT DOCUMENTS

| | | |
|---|---|---|
| 4,138,132 | 2/1979 | Doyle . |
| 4,620,713 | 11/1986 | Sakaguchi .............................. 280/152.3 |
| 4,878,558 | 11/1989 | Asakura . |
| 5,092,421 | 3/1992 | Tsurumaki . |
| 5,165,712 | 11/1992 | Fuller ........................................ 280/277 |
| 5,186,274 | 2/1993 | Hegman .................................. 180/227 |

*Primary Examiner*—Lanna Mai
*Assistant Examiner*—Avraham H. Lerner
*Attorney, Agent, or Firm*—G. Turner Moller

[57] ABSTRACT

A front fork assembly of a motorcycle comprises a pair of hydraulic shock absorbers with a lower cylinder end attached to a front wheel assembly and an upper rod end attached to a fork frame member whereby relative movement is accommodated between the wheel assembly and the fork frame member. A mud guard assembly includes a pair of elongate mud guard elements mounted on the cylinder and extending upwardly in front of the polished rod of the hydraulic cylinder. The mud guard elements move inside a pair of slots provided by a bracket attached to the fork frame member. Telescoping and untelescoping movement of the hydraulic shock absorbers causes the mud guard elements to reciprocate inside the slots. Edges provided by the slots scrape mud off the mud guard elements.

13 Claims, 2 Drawing Sheets

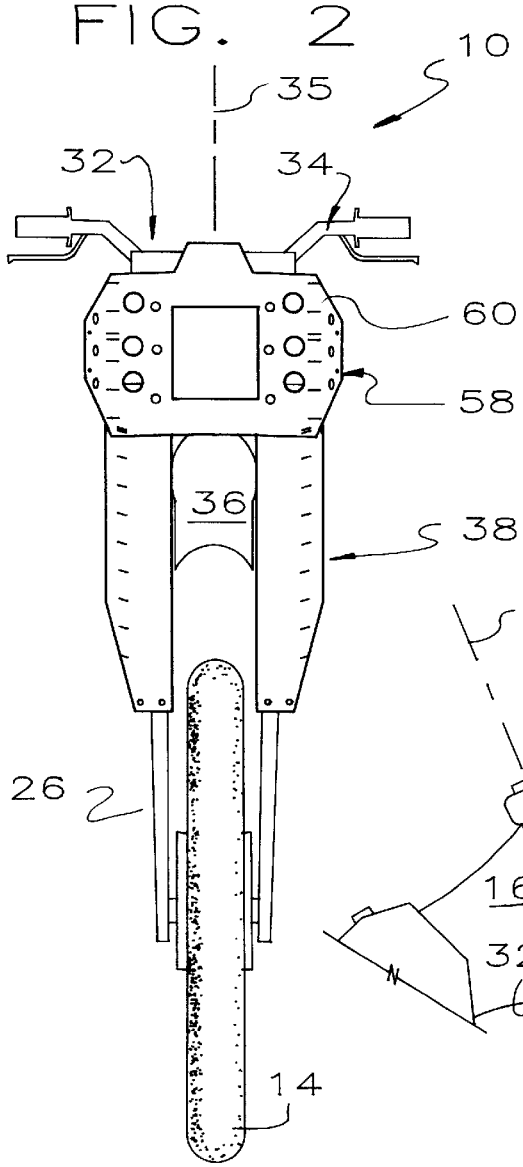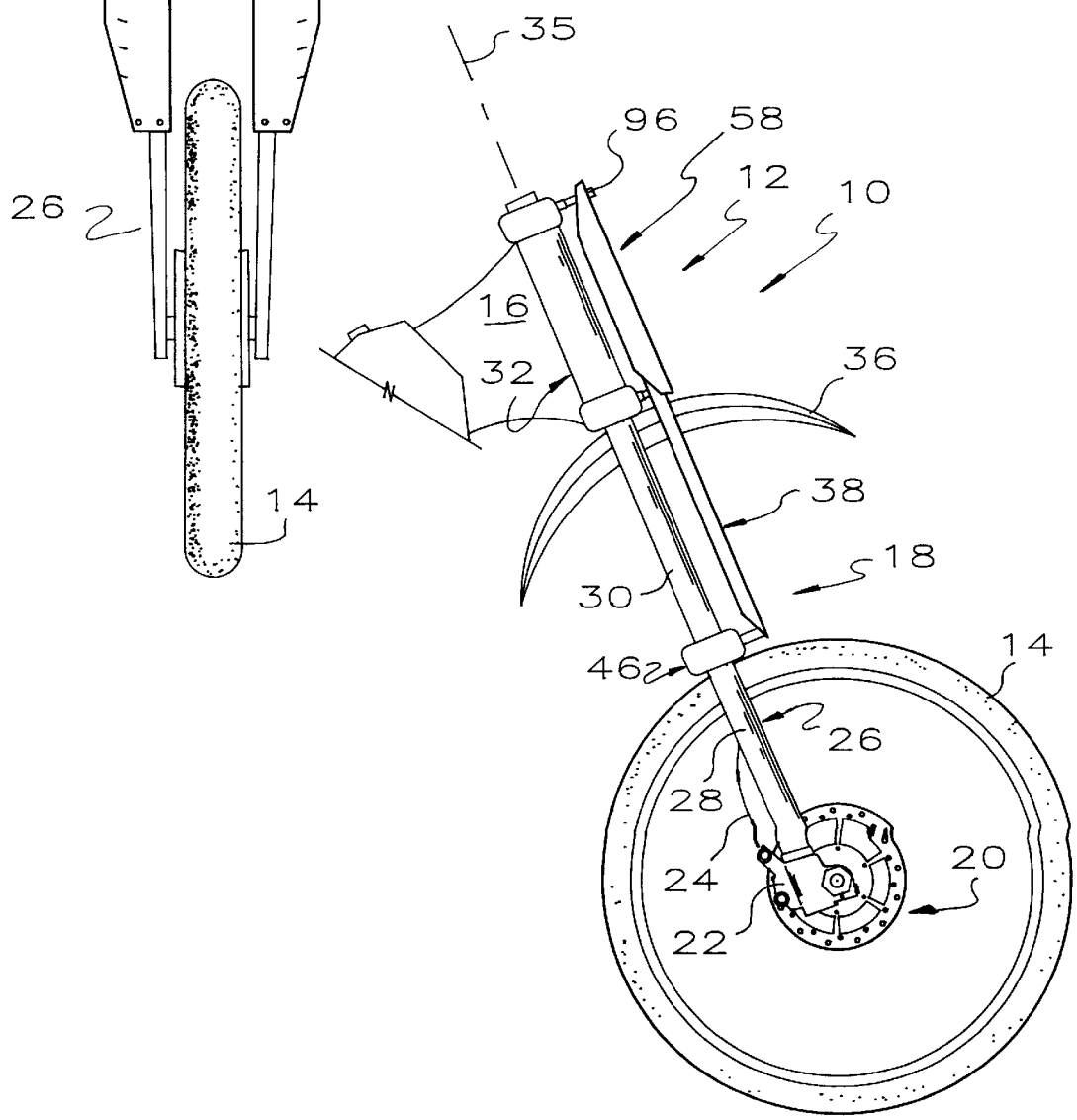

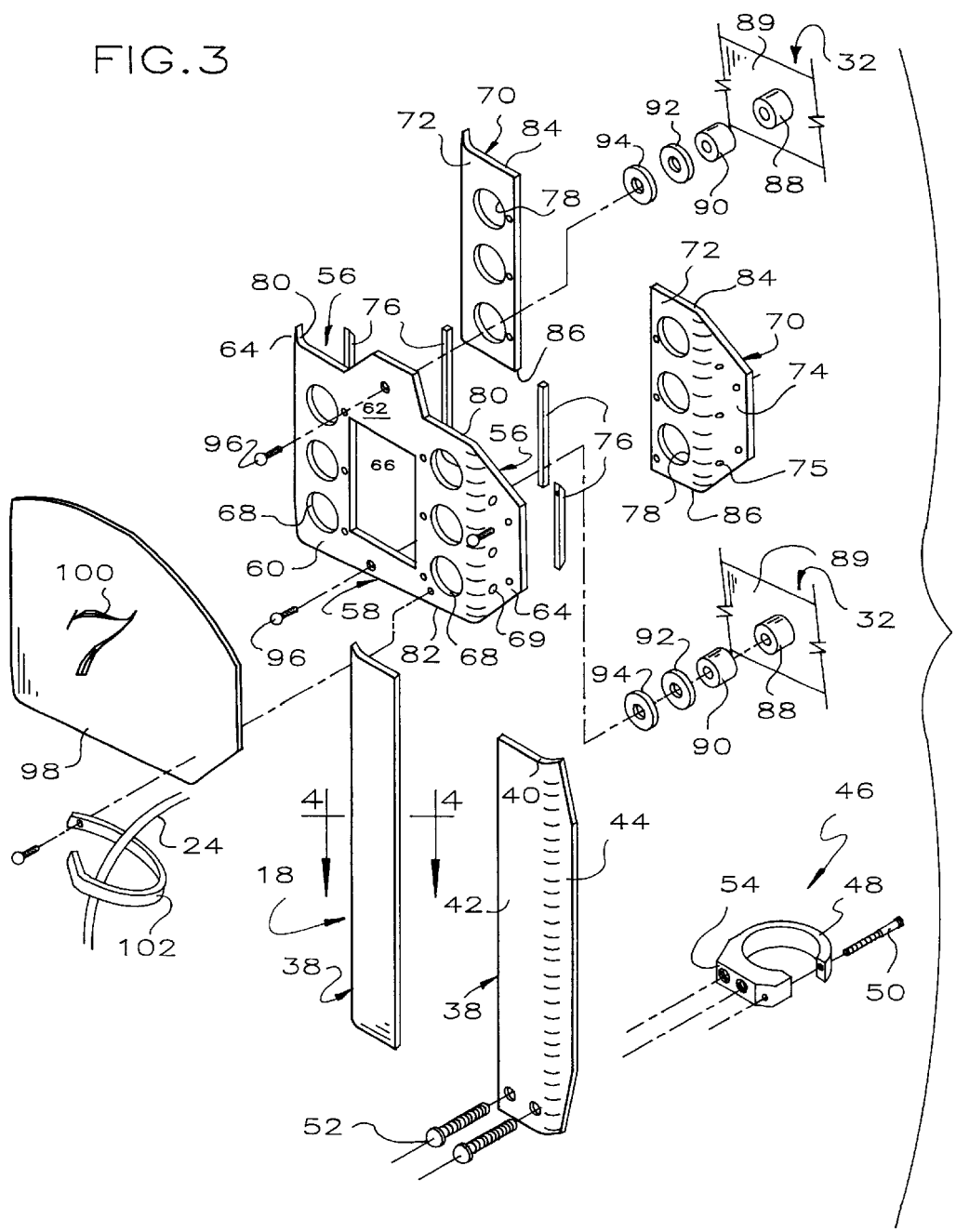

MUD GUARD MOTORCYCLE FORK

This invention is a mud guard that is attached to the fork of a motorcycle to protect the rod of a hydraulic shock absorber.

BACKGROUND OF THE INVENTION

Motorcycles have evolved into specialized forms, as widely different as highway cruisers and dirt bikes. This invention has use particularly on dirt bikes or other motorcycles run off the road in wet conditions, usually while racing.

The standard off road motorcycle includes a front fork assembly that includes a pair of hydraulic shock absorbers, each comprising a hydraulic filled cylinder having a piston assembly working inside the cylinder and a rod extending through the end of the cylinder. One design is to provide the large, or cylinder, end of the shock absorber down with the rod end up. In this design, the cylinder is connected to the wheel assembly and the rod is connected to the steering assembly. A more recent arrangement is to provide the cylinder end up with the rod end connected to the front wheel. This invention relates to motorcycle fork constructions having a hydraulic shock absorber with the cylinder end down.

It has been thought desirable to provide mud guards to prevent mud from accumulating on the rods of the hydraulic shock absorbers. The rods are highly polished to seal against resilient seals in the end of the cylinder. It is easy to see that mud or other abrasive material damages the seals acting between the hydraulic cylinder and rod. Mud guards have been provided for motorcycle forks in which the hydraulic cylinder is up as shown in U.S. Pat. Nos. 4,878,558 and 5,092,421. Another disclosure of interest is found in U.S. Pat. No. 4,138,132.

SUMMARY OF THE INVENTION

In this invention, a motorcycle comprises a fork having a pair of hydraulic shock absorbers in which the cylinder end is down with the rod extending upwardly. A mud guard is attached to the cylinder, preferably adjacent the upper end thereof, and extends upwardly, generally parallel to the rod. A bracket is attached to a fork frame member that turns in response to turning of the handle bars. Typically, the bracket is attached to a license plate connector. As the motorcycle bounces over the terrain, the shock absorber rod reciprocates into and out of the cylinder. The mud guards attached to the cylinder accordingly reciprocate in and out of the bracket. The bracket provides a slot receiving the mud guards so any mud accumulating on the guards is shed on each reciprocation of the mud guard. A plurality of openings in the bracket allow mud accumulating on the bracket to be discharged. The mud guard of this invention accordingly prevents mud from accumulating on the shock absorber rod and also prevents mud from accumulating on the mud guard.

It is an object of this invention to provide an improved mud guard assembly for a motorcycle of the type having a hydraulic shock absorber with the cylinder end down.

A further object of this invention is to provide an improved mud guard which protects the rod of a hydraulic shock absorber of the type having a cylinder end down and which is capable of shedding mud accumulating on the mud guard.

These and other objects and advantages of this invention will become more apparent as this description proceeds, reference being made to the accompanying drawings and appended claims.

BRIEF DESCRIPTION OF THE DRAWINGS

FIG. 1 is a partial side view of a motorcycle showing a front fork, front wheel assembly and mud guard assembly of this invention;

FIG. 2 is a front view of the motorcycle of FIG. 1, certain parts being omitted for purposes of illustration;

FIG. 3 is an exploded isometric view of the mud guard assembly of this invention;

FIG. 4 is a cross-sectional view of a mud guard element shown in FIG. 3, taken along line 4—4 thereof as viewed in the direction indicated by the arrows; and FIG. 5 is a cross-sectional view of another embodiment of a mud guard element of this invention.

DETAILED DESCRIPTION

Referring to FIGS. 1–4, a motorcycle 10 includes a front fork 12, a front wheel 14 and a vehicle body frame 16. The front fork assembly 12, except for a mud guard assembly 18, is of conventional design and includes a wheel assembly 20 having a brake mechanism 22 operated by a cable 24. A pair of hydraulic shock absorbers 26 each include a lower cylinder 28, a piston (not shown) working inside the cylinder 28 and a rod 30 connected to the piston and extending upwardly past a seal (not shown) in the upper end of the cylinder 28. The upper end of the rods 30 connect to a fork frame member 32 which connects to handle bars 34 so the fork frame member 32 can be rotated about an upright axis 35. A front fender 36 connects to the fork frame member 32. Those skilled in the art will recognize the motorcycle 10 to be of a conventional dirt bike configuration, such as a Kawasaki Model KX250-G1. For a more complete description of the motorcycle 10 and the front fork assembly 12, reference is made to publications of Kawasaki Heavy Industries.

The rods 30 are highly polished to provide an effective seal with the sealing mechanism inside the upper end of the cylinder 28. As shown in FIGS. 1–3, the mud guard assembly 18 of this invention is effective to prevent mud thrown up by a vehicle in front of the motorcycle 10 from contacting the polished rod 30. To this end, the mud guard assembly 18 includes a guard element 38 mounted in front of each of the rods 30. The guard elements 38 are preferably made from a sheet of rigid organic polymer material such as polyethylene or the like which has been bent on the corner of a die to provide a bend 40 separating relatively flat sections 42, 44.

As shown best in FIGS. 1 and 3, a connector 46 secures the guard element 38 to the upper end of the cylinder 28. The connector 46 is a generally C-shaped clamp 48 having a first fastener 50 clamping the connector 46 to the cylinder 28 and a pair of second fasteners 52 securing the guard element 38 to a flat end 54 of the connector 46.

It is desirable to scrape mud off the mud guard elements 38 so they do not become loaded with mud and is very desirable to do so substantially continuously. To this end, the mud guard elements 38 are mounted to reciprocate in a device presenting a plurality of edges to each of the elements 38, the reciprocation being in response to telescoping and untelescoping of the hydraulic shock absorbers 26. Thus, when the mud guards 38 move across the edges, mud is scraped off the mud guards 38 and ultimately falls off by gravity.

Accordingly, the mud guard elements 38 extend upwardly into a pair of vertical slots 56 provided by a bracket 58 connected to the fork frame member 32 and positioned above the fender 36. The bracket 58 includes a front plate 60 having a flat central section 62 and a pair of angled wings 64 that are bent at the same angle as the mud guard sections 42, 44. The front plate 60 includes a relative large central opening 66 and a series of vertically spaced openings 68. The angled wings 64 provide a series of smaller vertically spaced openings 69. The large central opening 62 substantially reduces the weight of the bracket 58 without impairing its strength. The openings 68, 69 also reduce the weight of the bracket 58 without impairing its strength and open into the slots 56 providing edges to scrape mud from the mud guard elements 38 as the elements 38 reciprocate in the slots 56.

Attached to the back side of the bracket 58 are a pair of angled plates 70 having an inner flat section 72 and an outer wing 74 bent at the same angle as the wing 44 of the mud guard element 44. The plates 70 are spaced from the bracket 58 by suitable spacers 76 thereby providing the slots 56. The plates 70 provide openings 78 that reduce the weight of the plates 70 without impairing its strength and also provide a plurality of edges that scrape mud off the mud guard elements 38 as they reciprocate in the slots 56. The outer wings 74 also provide a series of vertically spaced openings 75 that reduce the weight of the plate 70 and scrape mud off the mud guard elements 38 as they reciprocate in the slots 56. It will be seen that when a mud laden guard element 38 moves upwardly relative to the bracket 58, mud on the element 38 is scraped off by the edge provided in each of the openings 68 as well as the upper and lower edges 80, 82 of the front plate 60. Although there is normally considerably less mud on the back of the mud guard elements 38, any mud clinging to the guard elements 38 is scraped off by the edges in each of the openings 78 as well as the upper and lower edges 84, 86 of the plates 70. Thus, each of the mud guard elements 38 is exposed to downwardly facing edges from the lower edges 82, 86 and downwardly facing edges from a multiplicity of openings 68, 70 as the mud guard elements 38 reciprocate inside the slots 56. The bracket 58 is preferably of a height where the upper end of the mud guard elements 38 extend above the top of the bracket 58 in a fully compressed condition of the hydraulic shock absorbers 26. It will be seen that the upwardly facing top edges 80, 84 are effective to scrap mud off the guard elements 38 as the guard elements move downwardly relative to the bracket 58.

It will be seen that the slots 56 comprise a flat segment accommodating the flat section 42 of the mud guard element 38 and an angled segment accommodating the angled wing 44 of the mud guard element 38. The slots 56 are of a width slightly larger than the width of the mud guard elements 38 so there is no binding but are sufficiently narrow to promote scraping of mud off the mud guard elements 38 as they reciprocate in the slots 56 caused by relative movement between the wheel 14 and the motorcycle frame 16 as allowed by the hydraulic shock absorbers 26.

The bracket 58 may be attached in any suitable manner to the fork frame member 32 and is conveniently attached to a pair of vertically spaced license plate bosses 88 provided by a triple clamp 89 of the fork frame member 32. A plastic spacer 90, metal washer 92 and rubber washer 94 are sandwiched between the front plate 60 and the boss 88 by upper and lower threaded fasteners 96.

When racing, motorcycles are normally provided with an identification number. The bracket 58 provides a convenient location for an plate or decal 98 having an identifying indicia 100. Preferably, the plate 98 is spaced slightly from the plate 60 to allow mud to escape from the openings 68, 69.

As shown in FIG. 3, a clip 102 is mounted in the lower right corner, or other suitable location, of the bracket 58 or plate 98 to receive and restrain the brake cable 24 so it does not become entangled and damaged.

Referring to FIG. 5, another embodiment of a mud guard element 104 comprises a flat central section 106 and a pair of outer angled wings 108. In the embodiment of FIG. 5, the corresponding bracket (not shown) provides slots compatible with the shape of the mud guard elements 104.

Operation of the mud guard assembly 18 of this invention should now be apparent. As the front fork frame 16 moves downwardly toward the wheel assembly 20 and compresses the shock absorbers 26, the mud guard elements 38 move upwardly into the bracket 58. Mud on the guard elements 38 tends to be scraped off by the downwardly facing bottom edges 82, 86 of the bracket 58 and by the downwardly facing edges of the openings 68. If the identifying decal or plate 98 is not being used or is spaced from the front of the bracket 58, mud tends to fall out the front of the front openings 68. If the identifying decal or plate 98 is flush against the bracket 58, mud tends to fall out of the back openings 78 and tends to be pushed upwardly to exit from the top of the slot 56. Although it might appear that it is difficult for mud to exit the bracket 58 with the plate 98 flush against the front face 62, there is so much movement and/or vibration going on, mud easily falls off the bracket 58.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. A motorcycle front fork assembly comprising
   a wheel assembly;
   a pair of generally parallel shock absorbers comprising a lower cylinder connected to the wheel assembly and a rod extending upwardly out of the cylinder;
   a fork frame member connected to the shock absorber rods whereby up-and-down movement of the wheel assembly relative to the fork frame member is accommodated; and
   a mud guard assembly comprising
      a mud guard element connected to each of the cylinders and extending upwardly generally parallel to the rod; and
      a bracket mounted on the fork frame member providing a pair of slots receiving the mud guard elements whereby up-and-down movement of the fork frame member relative to the wheel assembly causes mud on the mud guard element to be scraped off by edges provided by the bracket.

2. The motorcycle front fork assembly of claim 1 further comprising a fender, the bracket being above the fender.

3. The motorcycle front fork assembly of claim 2 wherein the bracket provides at least one plate having a plurality of openings intersecting the slots whereby edges provided by the openings scrape mud off the mud guard element in response to reciprocation of the hydraulic shock absorbers.

4. The motorcycle front fork assembly of claim 1 wherein the mud guard elements each include a first flat section lying in a plane parallel to the hydraulic shock absorbers and a second flat section at an angle relative to the first flat section.

5. The motorcycle front fork assembly of claim 4 wherein the first flat section provides the plurality of openings and wherein the second flat section provides a series of openings intersecting the slots whereby edges provided by the series of openings scrape mud off the mud guard element in response to reciprocation of the hydraulic shock absorbers.

6. The motorcycle front fork assembly of claim 4 wherein the mud guard elements each include a third flat section at an angle relative to the first flat section.

7. The motorcycle front fork assembly of claim 1 wherein the bracket comprises a front plate having a first planar section and a back plate having a second planar section, the first and second planar sections being spaced apart by the slots, the front and back plates having a plurality of openings intersecting the slots whereby edges provided by the openings scrape mud off the mud guard element in response to reciprocation of the hydraulic shock absorbers.

8. A motorcycle front fork assembly comprising a wheel assembly and a fork frame member;

a pair of generally parallel shock absorbers, connected between the wheel assembly and the fork frame member, including a cylinder and a rod extending out of the cylinder, whereby up-and-down movement of the wheel assembly relative to the fork frame member is accommodated; and a mud guard assembly comprising a mud guard element connected to each of the cylinders and extending generally parallel to the rod; and a bracket providing a pair of slots receiving the mud guard elements, the bracket comprising a front member and a back member, at least one of the members having an upper edge, a lower edge, and a multiplicity of openings therein providing a series of edges for scraping mud off the mud guard elements in response to repeated movement of the wheel toward and away from the fork frame member.

9. The motorcycle front fork assembly of claim 8 further comprising a fender, the bracket being above the fender.

10. The motorcycle front fork assembly of claim 9 wherein the mud guard elements each include a first flat section lying in a plane parallel to the hydraulic shock absorbers and a second flat section at an angle relative to the first flat section.

11. The motorcycle front fork assembly of claim 10 wherein the first flat section provides the plurality of openings and wherein the second flat section provides a series of openings intersecting the slots whereby edges provided by the series of openings scrape mud off the mud guard element in response to reciprocation of the hydraulic shock absorbers.

12. The motorcycle front fork assembly of claim 11 wherein the mud guard elements each include a third flat section at an angle relative to the first flat section.

13. The motorcycle front fork assembly of claim 9 wherein the bracket comprises a front plate having a first planar section and a back plate having a second planar section, the first and second planar sections being spaced apart by the slots, the front and back plates having a plurality of openings intersecting the slots whereby edges provided by the openings scrape mud off the mud guard element in response to reciprocation of the hydraulic shock absorbers.

\* \* \* \* \*